June 6, 1961 J. R. CLIFTON 2,987,133
APPARATUS FOR MOVING AIRCRAFT AND OTHER WHEELED
STRUCTURES ON THE GROUND
Filed May 18, 1956 6 Sheets-Sheet 3

INVENTOR.
JOHN R. CLIFTON
BY
Paul A. Weilein
ATTORNEY.

United States Patent Office 2,987,133
Patented June 6, 1961

2,987,133
APPARATUS FOR MOVING AIRCRAFT AND OTHER WHEELED STRUCTURES ON THE GROUND
John R. Clifton, Rolling Hills, Calif., assignor to Air Logistics Corporation, Pasadena, Calif., a corporation of Delaware
Filed May 18, 1956, Ser. No. 585,848
32 Claims. (Cl. 180—14)

This invention relates to apparatus for moving aircraft or other heavy wheeled structures on the ground.

Heretofore the towing or movement of large and heavy aircraft on the ground has required the use of highly powered and extremely large and heavy vehicles to obtain requisite traction, for example, a four wheel drive tractor having a gross weight in excess of 20,000 pounds. This ratio of tow vehicle weight to aircraft weight indicates that for towing or moving the larger aircraft that are being produced and will be produced in the future, a vehicle having a gross weight in excess of 50,000 pounds will be required. Tow vehicles as presently used and vehicles of such great weight may not readily be transported, particularly by aircraft.

It is an object of the present invention to provide improved apparatus for moving aircraft, or other large wheeled structures on the ground, which is constructed, arranged and operated in a novel and highly efficient manner to utilize the weight of the aircraft or other structure to provide traction making it possible to move heavy aircraft or other heavy wheeled structures with a motor vehicle having considerably less weight and bulk than tow vehicles heretofore employed.

It is another object of this invention to provide apparatus for moving aircraft on the ground, which includes a motor vehicle of such small bulk and low weight as to make it possible to equip the vehicle with the power and service components required for normal line servicing and maintenance of aircraft. Such a vehicle, in view of its low weight and small bulk, readily may be transported by airplane and constitutes a compact unit serving the purposes of several servicing vehicles heretofore required, including a heavy tow vehicle such as hereinbefore mentioned.

It is another object of this invention to provide novel and highly efficient apparatus for moving an aircraft or any other large wheeled structure from place to place on the ground by driving one or more of the wheels of the aircraft or other structure through the medium of a novel drive means powered by a motor vehicle operable to steer the aircraft or other structure during such movement.

It is another object of this invention to provide powered, vehicular apparatus wherein driven ground-engaging wheel means is subject to movement between ground-engaging position and a position for engaging and driving wheel means of the landing gear of an aircraft, for moving the aircraft on the ground.

Another object of this invention is to provide novel wheel-supported, power-operated apparatus which may be operated for simply towing or pushing small aircraft, or operated so that a wheel or wheels thereof are used to frictionally drive one or more wheels of the landing gear of large aircraft.

A further object is to provide a novel combined draft and driving assembly, or what may be termed a tow bar or draw bar assembly, adapted to connect a motor vehicle with an airplane so that a friction drive means carried by the assembly and actuated by a shaft driven from the motor vehicle, may be operated to drive one or more of the landing gear wheels of the airplane for moving the airplane on the ground as desired according to the steering of the motor vehicle.

An additional object is the provision of a tow bar assembly wherein means for applying a driving force to one or more wheels of an airplane includes one or more wheels movable between a ground-engaging position serving as a support for and aiding in manipulating and transporting the tow bar assembly, and a position out of contact with the ground for engaging and driving one or more of the airplane landing wheels.

Further, it is an object to provide a novel power operated means for moving the drive wheel or wheels of vehicular apparatus embodying the present invention, between a ground engaging position and the position for engaging and driving one or more wheels of the aircraft.

It is a further object to provide apparatus of the character described wherein novel power operated means is selectably operable to urge a drive wheel or wheels of the apparatus into frictional driving engagement with a wheel or wheels of the landing gear of an aircraft under a predetermined force to assure an effective transmission of driving power to the landing gear wheel or wheels.

It is another object to provide apparatus such as described, wherein power operated means for urging a drive wheel or wheels of the apparatus into driving engagement with a wheel or wheels of landing gear of an airplane, will maintain the drive wheel or wheels in effective driving engagement with a wheel or wheels of the airplane under all load conditions developed in moving the airplane on the ground.

Another object of this invention is to provide a tow bar assembly which is constructed and arranged so that it may be connected with the nose wheels or other wheels of an airplane and powered to drive the nose wheels or other wheels by a motor vehicle located ahead of or behind such wheels of the airplane, whereby the airplane may be moved from place to place as desired and steered in a particularly easy manner by steering the motor vehicle.

An additional object hereof is the provision of a tow bar assembly such as described which may be folded to form a compact unit subject to being conveniently towed as a trailer, stored or transported.

A further object hereof is the provision of a novel means for detachably connecting the tow bar assembly with a motor vehicle so that the tow bar assembly is subject to universal movement relative to the vehicle while maintaining a driving connection between the driving wheel or wheels on the outer end of the assembly.

This invention possesses many other advantages and has other objects which may be made more easily apparent from a consideration of several embodiments of the invention. For this purpose there are shown several forms in the drawing accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

The accompanying drawings and following description show and describe two ways in which this invention may be carried out. One way, consists in the provision of a tow bar assembly which is connected between a powered vehicle and an airplane or other heavy wheeled structure to drive wheels of the airplane or structure through wheels of the tow bar assembly. The other way in which the invention may be carried out is to provide a powered vehicle having wheels which are utilized to drive wheels of an airplane or other heavy wheeled structure. Thus, it is apparent that this invention constitutes a powered, wheel-supported assembly having one or more ground-engaging wheels movable between ground engaging position and a position for engaging and driving one or more wheels of any heavy wheeled structure, whether the latter be an airplane or any other structure which best may be moved on the ground by driving a wheel or wheels thereof in this manner.

As shown in FIGS. 1–17 of the accompanying drawings, one form of apparatus embodying the present invention includes an elongated tow bar or draw bar assembly 1 adapted to be coupled to an airplane 2 and a motor vehicle 3 to serve as a combined driving and draft link for supplying power from the motor vehicle to drive one or more of the landing gear wheels 4 of the airplane. With this arrangement the weight of the airplane is utilized to provide traction in moving the airplane about on the ground.

The construction and mode of use of the tow bar assembly 1 is such that the motor vehicle employed in conjunction therewith, may be small and of low weight compared to the size and weight of vehicles heretofore used to tow or push large and heavy airplanes. Accordingly, the vehicle 3 as here shown, is provided with means whereby it may be used solely to supply power through the tow bar assembly 1 for driving a wheel or wheels 4 of the airplane landing gear and to steer the airplane, or to supply power to the vehicle wheels at the same time the airplane wheels are driven or to drive the vehicle wheels only.

As here shown, the tow bar assembly 1 includes an elongated rigid bar of one or more sections, having means 5 at one end for detachably connecting the assembly with the vehicle 3. Means 6 at the other end of the assembly provide for detachably connecting the assembly with the landing gear carriage 7 of an airplane whereby the assembly becomes a draft link or draw bar for towing or pushing small airplanes. However, as a primary purpose of the tow bar assembly is to supply power for driving one or more of the landing gear wheels 4 of large and heavy airplanes, drive means 8 is arranged thereon so as to be drivingly engaged with a wheel or wheels of the airplane and is actuated by a drive shaft 9 carried by the tow bar assembly and in turn driven from a power take-off unit 10 on the vehicle 3.

The drive means 8 in the present embodiment of this invention may, as here shown, include a pair of wheels 11 having pneumatic tires 12 thereon and arranged to constitute a wheeled support for the outboard end of the tow bar assembly 1 as well as a means for frictionally driving the airplane wheels 4. In this connection it should be noted that one or more of the wheels 11 may be used depending upon the size of the airplane to be moved and the type of landing gear on the airplane.

The use of the wheels 11 as a support for the tow bar assembly 1 facilitates towing of the assembly as a trailer and the positioning thereof for operative connection with the airplane to be moved.

In order that the wheels 11 may be operated to drive the landing gear wheels 4 of the airplane, means 13 connected with the tow bar assembly and adapted to be connected with the landing gear carriage 7, is operable to move the wheels from the ground into frictional driving engagement with the wheels 4 of the airplane and vice versa. Preferably, the means 13 is power actuated in a manner so that a reliable driving force will be applied to the wheels 4 regardless of externally applied forces which may be developed in the linkage with the airplane in moving the airplane in accordance with this invention.

Figures 1, 3:
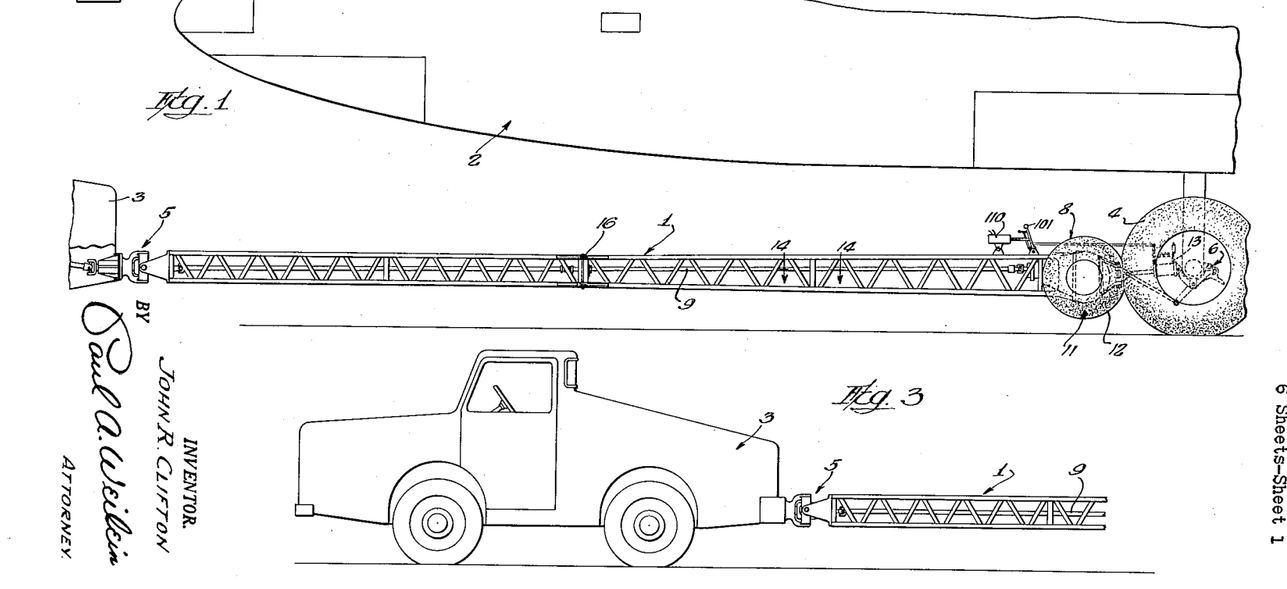
FIG. 1 is a side elevation of apparatus embodying the present invention, shown in position to move an airplane over the ground with the aid of a power-supplying motor vehicle; only portions of the airplane and vehicle being shown.
FIG. 3 is a side elevation of a motor vehicle and a portion of the tow bar assembly connected thereto.
Figure 2:
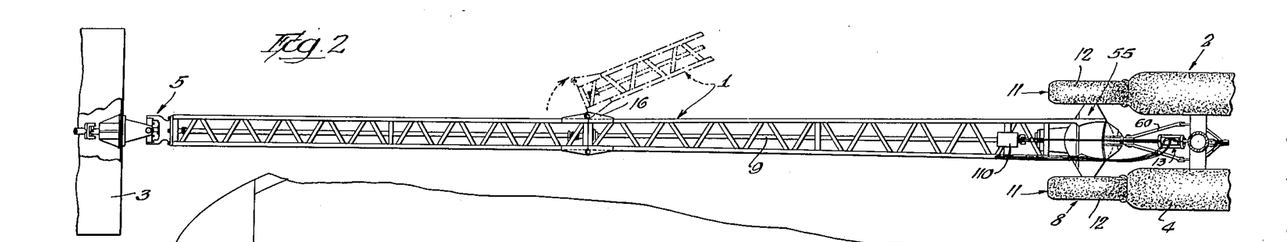
FIG. 2 is a top plan view of the apparatus shown in FIG. 1, indicating in dot-dash lines how the tow bar assembly of the apparatus may be folded.

Referring more specifically to the construction of the tow bar assembly 1, it will be seen with reference to FIGS. 1, 2, 12, 13 and 16 that when made of sections, the sections thereof may be joined by hinge means 16 providing for the folding of the sections to lie alongside one another as indicated in FIG. 2, whereby the folded unit may be conveniently transported or stored. Moreover, the hinge means 16 provides for detachably connecting the sections of the assembly 1 whereby, if desired, but one section may be used as the connecting link between the airplane and the tow vehicle. Thus, the hinge means includes apertured ears 17 on opposite sides of adjacent ends of the sections of the tow bar assembly and bolts 18 mounted in the ears and held in place by nuts 19. When the bolts 18 on both sides are in place, the sections of the tow assembly are rigidly joined in properly aligned relation. A bolt 18 one one side is removed to provide for a hinge action necessary for the folding of the sections. For example, if the inner tow bar section connected with the vehicle 3 is to be employed without the outer section, the means 6 and drive means 8 on the outer section are mounted on the outer end of the inner section.

Figures 12, 13, 16, 17, 18:
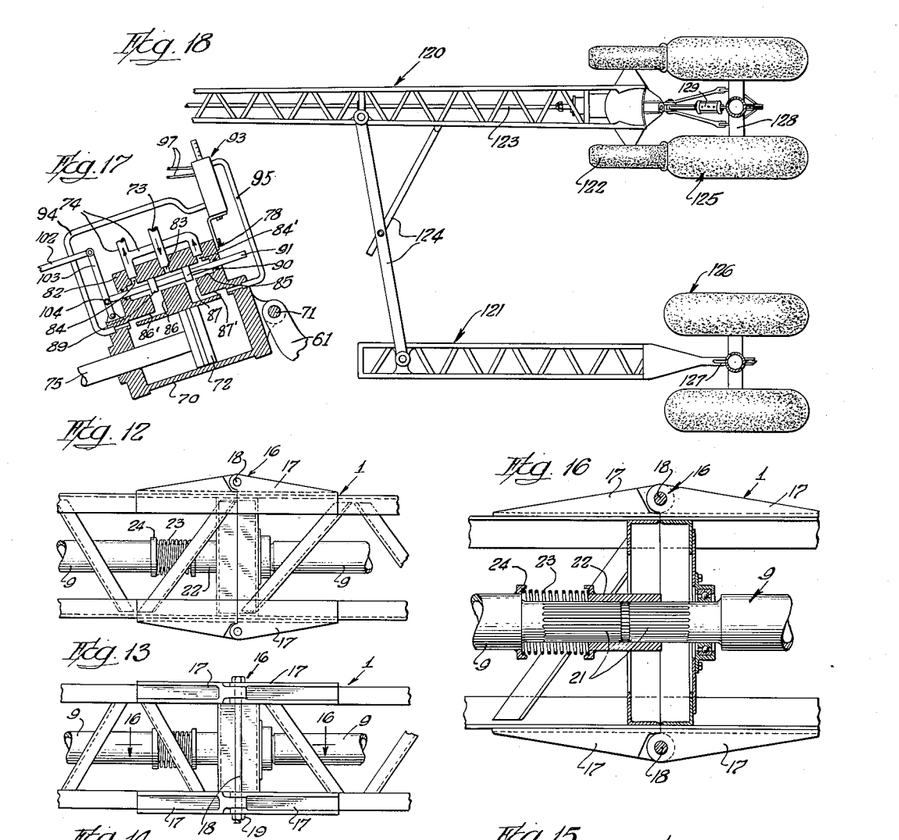
FIG. 12 is a fragmentary top plan view of the hinged joint in the sectional tow bar assembly.
FIG. 13 is a fragmentary side elevation of the structure shown in FIG. 12.
FIG. 16 is a sectional view taken on the line 16—16 of FIG. 13.
FIG. 17 is a schematic view of a control valve means for the power actuated means for moving the drive wheels into driving engagement with the wheels of an airplane.
FIG. 18 is a fragmentary top plan view of a modified form of this invention.

The drive shaft 9 is also made up of sections having splined joints. One of these joints is located adjacent the hinge connection of the sections of the tow bar assembly 1 as shown in FIGS. 12, 13, and 16, and comprises opposed splined ends 21 on the sections of the shaft 9 and a splined sleeve 22 axially slidably mounted on the ends 21 for movement between positions coupling and uncoupling the shaft sections. A coiled spring 23 confined between a shoulder 24 on one of the shaft sections and one end of the sleeve 22 urges the sleeve to a position joining the shaft sections in driving connection with one another. This sleeve is moved on one shaft section clear of the other shaft section to uncouple these sections when the tow bar assembly is to be folded.

Figure 14:
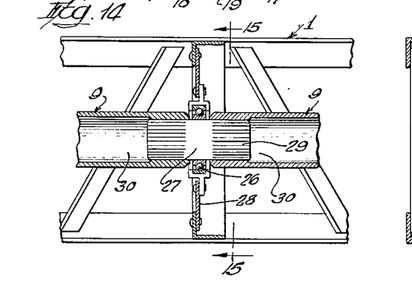
FIG. 14 is a fragmentary sectional view taken on the line 14—14 of FIG. 1; showing one of the bearings for the drive shaft of the tow bar assembly and a spline connection of the sections of the shaft.
Figure 15:
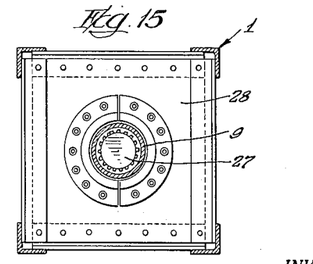
FIG. 15 is a sectional view taken on the lines 15—15 of FIG. 14.

Another of the joints between the sections of the shaft 9, also one of the bearings 26 for the shaft 9 are shown in FIGS. 14 and 15, wherein the joint includes a short shaft section 27 mounted in the bearing 26 supported by a bulkhead 28 on the tow bar assembly. This short section 27 has splined ends 29 removably extended into the splined tubular end portions 30 of the adjacent ends of the shaft sections, thereby drivingly connecting the shaft sections. Splined joints and bearings as shown in FIGS. 14 and 15 may be provided at suitably axially spaced joints along the tow bar assembly 1.

Figure 4:
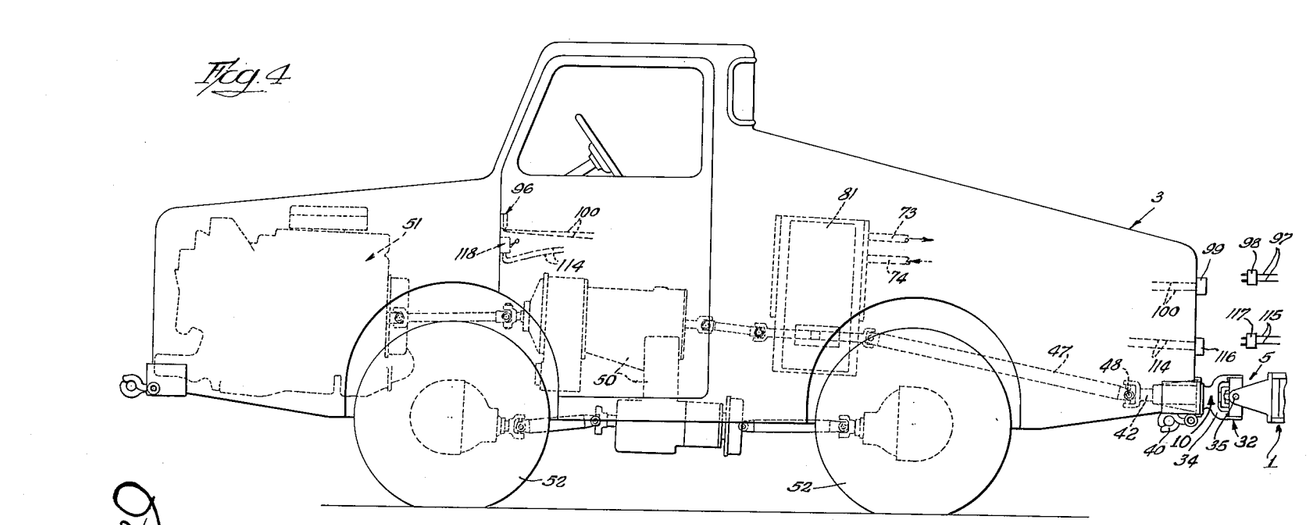
FIG. 4 is an enlarged side elevation of a motor vehicle showing schematically in dot-dash lines various power and control components embodied in the vehicle for driving and controlling a power take-off unit and the wheels of the vehicle.
Figure 5:
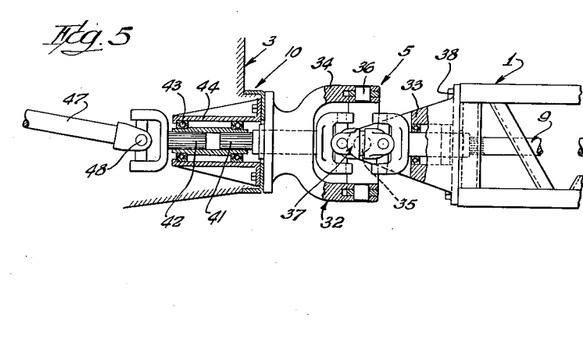
FIG. 5 is a fragmentary top plan view, partly in section, showing the means for detachably connecting the tow bar assembly with the motor vehicle; also the drive connection between the drive shaft of the tow bar assembly and a drive shaft on the motor vehicle.
Figure 6:
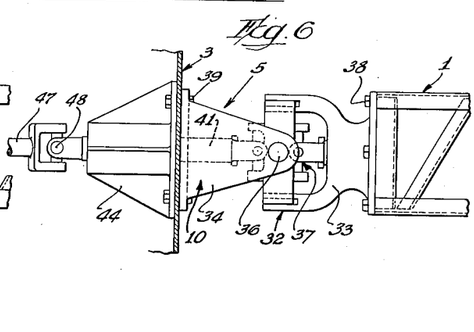
FIG. 6 is a side elevation of the assembly shown in FIG. 5.

As shown in FIGS. 4, 5, and 6, the means 5 for detachably connecting one end of the tow bar assembly with the motor vehicle 3 includes a universal joint assembly 32 comprising yokes 33 and 34 joined by means of pivot pins 35 and 36 disposed at right angles and pivoted one on the other. The yoke 33 is bolted to the adjacent end of the tow bar assembly 1 as at 38 whereas the yoke 34 is bolted as at 39 to the rear end of the motor vehicle 3. Suitable hitch means indicated at 40 in FIG. 4 may be employed when the vehicle 3 is used for conventional towing purposes.

The shaft 9 is provided with a universal joint 37 adjacent the shaft end 41, which latter is adapted to be connected with the power take-off unit 10 of the motor vehicle, the joint 37 being embraced by the universal joint 32. The shaft end 41 has a splined and detachable connection with the take-off unit 10, whereby the entire shaft 9 is driven by this unit. These universal joints provide for the desired relative movement of the vehicle and the tow bar assembly in the operation of the apparatus of this invention.

As shown in FIGS. 4 and 5 the power take-off unit 10 includes a short tubular drive shaft 42 mounted in bearings 43 in a housing 44 bolted to the vehicle 3. The splined end 41 of the shaft 9 is mounted in the bore of the short shaft 42 to provide the desired drive connection between the power take-off unit 10 and the shaft 9.

The short drive shaft 42 is coupled to a shaft 47 by means of a universal joint 48, the shaft 47 being driven from suitable selective dual transmission means 50 on the vehicle 3. As schematically shown in FIG. 4, the engine 51 of the vehicle 3, together with a dual selective transmission means 50 may be arranged, operated and controlled in any suitable manner to drive the four wheels 52 of the vehicle or the shafts 47 and 42 for driving the shaft 9 on the tow bar 1, or to drive the wheels 52 and the shafts 47, 42 and 9 at the same time.

Figure 7:
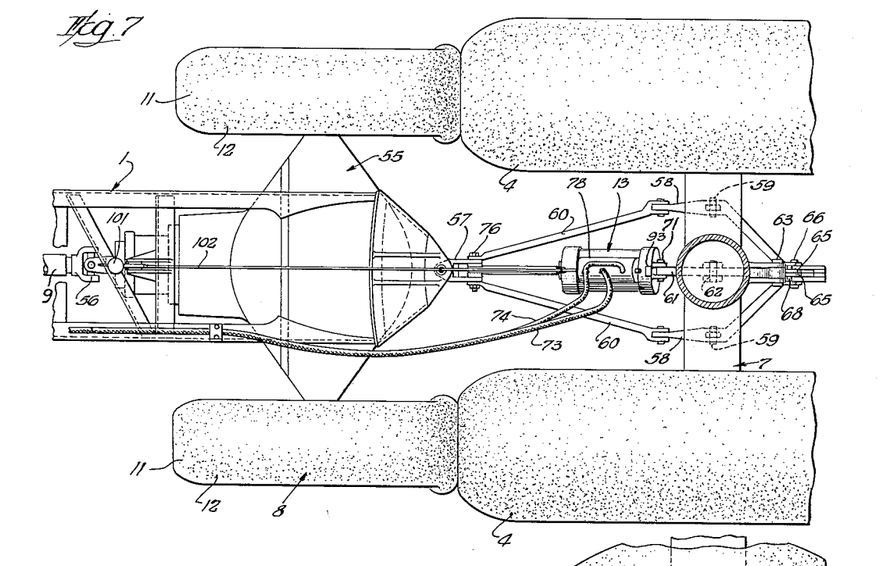
FIG. 7 is a top plan view, on an enlarged scale, showing the manner in which the drive wheels on the tow bar assembly are held in driving engagement with the nose wheels of an airplane.
Figure 8:
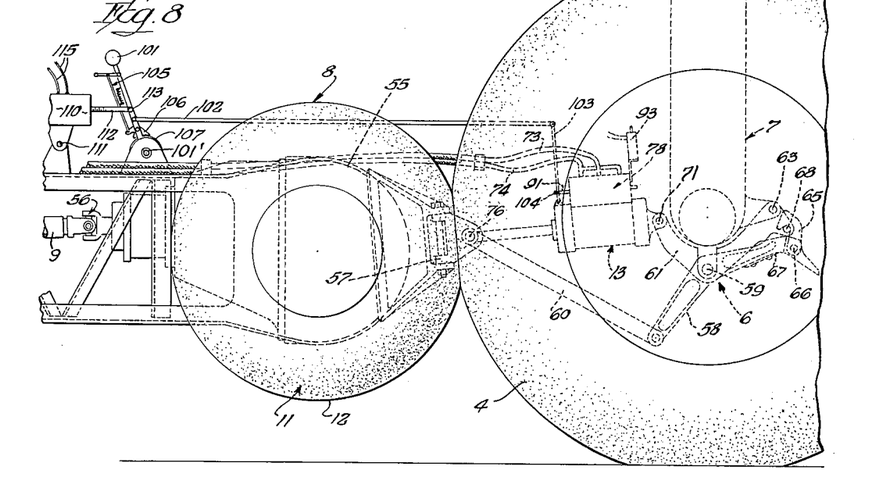
FIG. 8 is a side elevation of the assembly shown in FIG. 7.

Referring now more specifically to the drive means 8 which includes the drive wheels 11, it is seen with reference to FIGS. 2, 7 and 8 that these drive wheels are mounted on an axle-differential assembly 55 secured in any suitable manner to the end of the tow bar assembly that is to be connected to the airplane. This differential axle assembly is drivingly connected by means of a universal joint 56 with the drive shaft 9, whereby the wheels 11 may be driven.

The means 6 as shown in FIGS. 7–11 for connecting the tow-bar assembly 1 to the landing gear carriage 7 serves as a draft connection between the airplane and the tow bar assembly as well as a means for facilitating the alignment of the drive wheels 11 with the airplane wheels 4 and for maintaining such alignment. Accordingly, the means 6 includes a clevis 57 mounted on the axle-differential assembly 55, a pair of identical levers 58 adapted to be fulcrumed between their ends as at 59 on the landing gear carriage 7, and a pair of links 60 pivoted at their ends to the clevis 57 and adjacent ends of the levers 58, respectively. An arcuate mounting bracket 61 is mounted between its ends as at 62 on the carriage between the pivotal mountings 59 of the levers 58. One end of the bracket 61 is also fixed between ears 63 on the carriage 7. The other end of the bracket 61 serves as a support for the power operated means 13 for moving the wheels 11 into and from driving engagement with the airplane wheels 4 as will be hereinafter fully described.

The levers 58 carry manually releasable latch members 65 pivoted thereto as at 66. Springs 67 normally hold the latch members in position such that the levers 58 may be moved to cause the latch members to snap into latched engagement with a pin 68 carried by the bracket 62, responsive to operation of the power operated means 13 for lifting the wheels 11 into driving engagement with the airplane wheels 4.

It should be noted that the links 60 and levers 58 when latched as shown in FIG. 7, provide a wishbone form of linkage between the tow bar assembly 1 and the airplane landing gear carriage 7, to hold the wheels 11 in properly aligned and driving relation with the wheels 4 of the airplane. Accordingly, the links 60 extend somewhat divergently from the clevis 57 to the pivotal connection thereof with the levers 58. The portions of the levers 58 between the pivot mountings 59 and the ends of the levers which mount the latch members 65, are offset so as to converge toward the latch pin 68. Thus the two latch members 65 are disposed side-by-side and become latched on the pin 68 when the power operated means 13 is actuated to move the wheels 11 in contact with the airplane wheels 4. This arrangement of the links 60 and levers 58 assures that the wheels 11 will remain in properly aligned relation to the wheels 4 during the driving of the latter.

The power operated means 13, as here shown, includes a double-action hydraulic cylinder 70 pivoted as at 71 to the bracket 61, and a piston 72 having a piston rod 75. The outer end of the piston rod 75 is pivoted as at 76 to the clevis 57. When the piston rod 75 is retracted, the tow bar assembly is pulled toward the wheels 4 of the airplane and lifted so that the drive wheels 11 will be moved from position shown in FIG. 9 successively into position shown in FIGS. 10 and 11. When moved to the position shown in FIG. 10, the links 60 cause the levers 58 to rock so that the latch members 65 will snap into latching engagement with the pin 68 on the bracket 62, thereby locking the draft linkage comprising the levers 58 and links 60. Continued retraction movement of the piston rod 75 from position shown in FIG. 10 to position shown in FIG. 11 raises the wheels 11 into frictional driving contact with the airplane wheels 4.

Extension of the piston rod 75, after manually releasing the latch member 65, causes the tow bar assembly 1 and the wheels 11 to be lowered so that the wheels will rest on the ground.

In moving the airplane about on the ground, forces may be developed in the driving assembly, including the wheels 11 on the tow bar 1 and the wheels 4 on the airplane, which if not counteracted, would interfere with the desired frictional driving engagement of the wheels 11 with the wheels 4. Accordingly, a valve assembly 78 is mounted, as here shown, on the cylinder 70 and operates to control the flow of hydraulic fluid to the cylinder 70 in a manner assuring that the desired frictional driving engagement of the wheels 11 with the wheels 4, will take place under all load conditions developed in moving an airplane in accordance with this invention. Hydraulic hose lines 73 and 74 extend from a suitable source 81 of hydraulic fluid under pressure located on the vehicle 3, to the valve means 78 on the cylinder 70, these hose lines being supported on the tow bar assembly 1 in any suitable manner.

The valve means 78, as schematically shown in FIG. 17, includes a four-way valve unit of the neutral-leakage type wherein a housing 82 is provided with an intake port 83 and return ports 84 and 84'. The hydraulic hose line 73 is the supply line and is connected with the intake port 83, whereas the return hose line 74 is connected with return ports 84 and 84'. The ports 83, 84 and 84' open into a valve chamber 85 in the housing 82. From the chamber 85, passages 86 and 87 lead to ports 86', 87' in the cylinder 70. The ports 86' and 87' open into the cylinder 70 on opposite sides of the piston 72.

The flow of hydraulic fluid into and from the cylinder 70 is controlled by valve members 89 and 90 operable in the chamber 85 on a reciprocable shaft 91. The valve members 89 and 90 control the flow of fluid through the passages 86 and 87 according to their positions relative to said passages and permit circulation of the hydraulic fluid through the cylinder 70 at all times that the fluid is directed through hose line 73 from the source 81. The actuation of the piston 72 in one direction or the other depends upon the position of the valve members 89 and 90 relative to the passages 86 and 87. If the shaft 91 is moved to the left from the neutral position shown in FIG. 17, the valve member 89 moves to the left and the entrance of passage 86 is opened wider to flow of fluid entering the chamber 85 through the intake port 73 to the right of the passage 86. At the same time, the valve member 90 is disposed to the left, thus partially closing the side of passage 87 opposed to the intake port 83. With this arrangement, the piston 72 is moved to the right due to the fluid entering the chamber 85 being offered less resistance to flow through the passage 86 than through the passage 87, while fluid from the right end of the cylinder 70 flows out through the passage 87 to the return port 84', thence into the return hose line 74. Movement of the shaft 91 to the right reverses the effective flow and pressure of the fluid so that the piston 72 moves to the left. With this control, it is seen that when the piston 72 is moved to the right from the position shown in FIG. 17, the piston rod 75 is retracted, thereby moving the tow bar assembly 1 and wheels 11 toward the wheels 4 of the airplane. When the wheels 11 are drivingly engaged with the wheels 4, it is apparent that further retraction movement of the piston rod 75 causes the wheels 11 to be forced into engagement with the wheels 4. The outward extension of the piston rod 75, as effected by movement of the piston 72 to the left, will relieve the pressure of the wheels 11 against the wheels 4. Continuation of this extension of the rod 75 will lower the tow bar assembly 1 so that the wheels 11 will rest on the ground.

Means are provided in connection with the control valve 78 whereby the latter may be set to cause a fluid pressure to be applied to the piston 72 for urging the wheels 11 against the airplane wheels 4 at a predetermined force. This force may be varied according to the size and weight of the airplane or any other factors at hand, indicating that the wheels 11 should engage the wheels 4 under particular force to assure the desired frictional driving action. This setting and controlling means is subject to operation from a point on the tow bar assembly 1 adjacent the wheels 11 as well as from the vehicle 3.

A suitable combined pressure transducer and direct-reading differential pressure gauge 93 is mounted on or adjacent the valve housing 82 and connected by fluid lines 94 and 95 to opposite ends of the cylinder 70 to indicate the fluid pressure developed against the piston 72 according to adjustment of the valve shaft 91 and consequent positions of the valve members 89 and 90 with respect to the valve passages 86 and 87. The gauge 93 may be read by an operator in the vehicle 3 by means of an electrically operated gauge 96 located on the vehicle 3 and connected with a source of electrical energy (not shown) carried by the vehicle. Electrical conductors 97 are connected with the electrical components (not shown) of gauge 93 and extend along the tow bar assembly 1 to a plug 98 adapted to be coupled to a socket element 99 on the vehicle 3. The socket element 99 and plug 98 electrically connect conductors 100 leading from the gauge 96, with the conductors 97 leading to the gauge 93.

As a means for controlling the operation of the drive wheels 11 by actuation of the valve 78 from a point on the tow bar assembly 1 adjacent the wheels 11, an actuating lever 101 is pivoted as at 101' on the tow bar assembly and is connected by means of a link 102 with a lever 103 mounted on the cylinder 70. The shaft 91 of the valve 78 is pivoted as at 104 to the lever 103. The lever 101 is provided with a releasable setting means 105 including a friction shoe 106 engageable with a quadrant 107 to frictionally hold the lever 101 in a position in which the valve members 89 and 90 provide for actuation of the piston 72 under a predetermined force.

Provision is made for controlling the operation of the drive wheels 11 from the vehicle 3 through actuation of the valve 78. As here shown, this control means includes an electrically operated screw jack unit 110 pivoted as at 111 on the tow bar assembly 1, adjacent the actuating lever 101. The screw element 112 of the unit 110 is pivoted to the lever 101 as at 113, and is extended and retracted to move the lever 101 as desired to set and control the valve 78. The screw jack unit 110 is connected with an electrical source (not shown) on the vehicle 3, by a circuit including conductors 114 and 115 on the vehicle 3 and tow bar assembly 1 respectively. Electrical coupling units 116 and 117 at adjacent ends of the vehicle and tow bar assembly provide for detachably connecting the conductors 114 and 115. A control switch 118 mounted in the cab of the vehicle 3 and connected in the circuit for the screw jack unit 110 is operable to control the unit 110 for actuating the lever 101 and valve 78, thereby to control operation of the drive wheels 11.

For airplanes of different weights it is desired to vary the force at which the drive wheels 11 are urged against the airplane wheels 4. It may be desired, for example, to urge the wheels 11 against the wheels 4 under a force of 20,000 pounds. This may be accomplished by manipulating the lever 101 so that the valve members 89 and 90 are moved from neutral position to a position whereby the fluid pressure gages 93 and 96 indicate that the pressure in the cylinder 70, urging the piston 72 to retract the piston rod 75, has reached the desired force, after which the lever locking mechanism 105 is set to hold the lever and the valve members in such positions. Following this operation, the wheels 11 may be driven to drive the wheels 4. Due to the construction and operation of the valve assembly 78, the position and driving action of the wheels 11 will be maintained regardless of external forces being applied to the driving assembly during the moving of the airplane in accordance with this invention.

Figure 9:
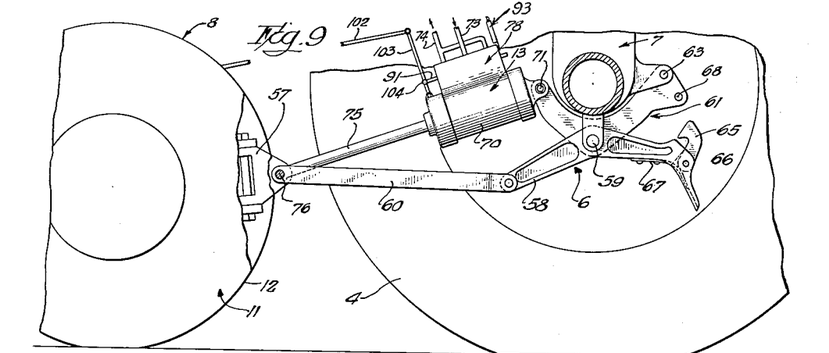
FIG. 9 is a fragmentary side elevation partly in section showing the first step of the operation for connecting the tow bar assembly with the nose wheel assembly of an aircraft, the drive wheels of the tow bar assembly being on the ground.

In the operation of the apparatus of the invention, when the tow bar assembly 1 is connected, as hereinbefore noted, to the motor vehicle 3, it may be towed or pushed by appropriate maneuvering of the vehicle, to position the wheels 11 adjacent to and in alignment with wheels 4 of an airplane. Next the connecting means 6 is coupled to the landing gear carriage 7 as shown in FIG. 9, with piston rod 75 fully extended, whereby a draft connection with the airplane readily may be made in the manner hereinbefore noted, while the wheels 11 rest on the ground.

An operator at the airplane-connected end of the tow bar assembly by actuation of the lever 101, or an operator in the vehicle 3 by actuation of the switch 118, may control operation of the power cylinder 70 to move the wheels 11 into driving engagement with the airplane wheels 4 under a predetermined force. Following this positioning of the drive wheels 11 in driving engagement with the wheels 4, the operator in the vehicle 3, through appropriate operation of the transmission means 50, causes the shaft 9 to be driven, thereby driving the wheels 11 so that the airplane wheels 4 are likewise driven to move the airplane as desired. During this movement of the airplane, the vehicle 3 is steered to thereby steer the airplane.

The tow bar assembly 1 may be disengaged from the airplane by shutting off the power to the shaft 9 through operation of the transmission 50, then manually releasing the latch members 65 and applying fluid to the cylinder 70 so as to extend the piston rod 75, after which bracket 61 and levers 58 may be detached from the airplane landing gear.

It is important to note that by driving the wheels of an airplane, or other wheeled structure in accordance with this invention, advantage is taken of the weight of the airplane or other structure to provide traction whereby the airplane or structure readily and easily may be moved with apparatus of much less gross weight and bulk than required of vehicles heretofore employed to actually tow or push airplanes through ground traction of wheels of such vehicles.

Instead of connecting the tow bar assembly to nose wheels or other wheels of the airplane, with the assembly and vehicle 3 in front of the landing gear, the tow bar assembly may be connected from the rear of any of the landing gear wheels and operated through the vehicle to drive the airplane wheels thereby moving the airplane and steering from the vehicle 3.

In some instances it may be desirable to drive the ground-engaging wheels of the apparatus hereof at the same time the airplane wheels are driven and this readily may be effected by appropriate operation of the dual transmission unit 50.

Among other advantages derived with apparatus embodying this invention is that the vehicular structure thereof in being of small bulk and weight compared to vehicles heretofore used for towing or pushing aircraft over the ground may be equipped with various power and servicing components such as required for normal line servicing of airplanes, and need not exceed gross weight of 10,000 pounds. It is estimated that a tow vehicle, depending solely on the traction afforded by driving four or more wheels thereof, and having a capacity for towing equivalent to that of the apparatus of the present invention, would have to weigh in excess of 50,000 pounds.

A modified form of this invention as shown in FIG. 18, comprises a tow bar assembly 120 identical with the tow bar assembly 1 shown in FIGS. 1–16, also a second tow bar 121 which is constructed in the same manner as the tow bar assembly 1 except that it is comparatively short and has no drive wheels and drive shaft corresponding to the wheels 122 and drive shaft 123 of the main tow bar 120. The second tow bar 121 is connected by cross beams 124 with the tow bar 120 so as to extend in parallel relation thereto but is not connected to the two vehicle. The purpose of this twin tow bar assembly arrangement is to adapt the apparatus to use with airplanes having two sets of landing gear wheels 125 and 126 arranged side by side. Accordingly, any suitable coupling means 127 may be employed to connect the tow bar 121 with the set of wheels 126. The two bar assembly 120, however, may be connected to the landing gear carriage 128 of the wheels 126 by means 129 identical with the means employed to connect the tow bar assembly 1 with an aircraft.

Figure 19:
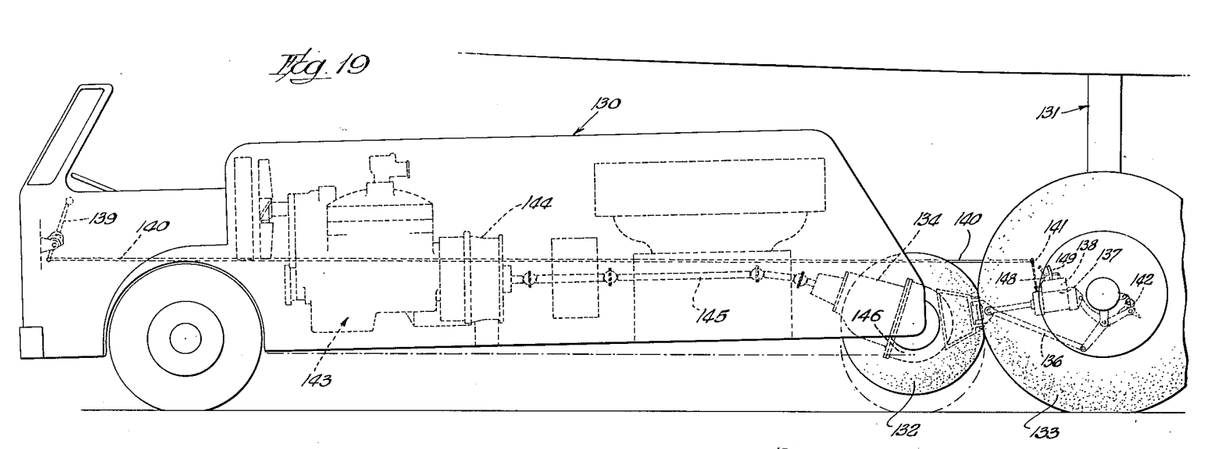
FIG. 19 is a side elevation of a modified form of this invention.
Figure 20:
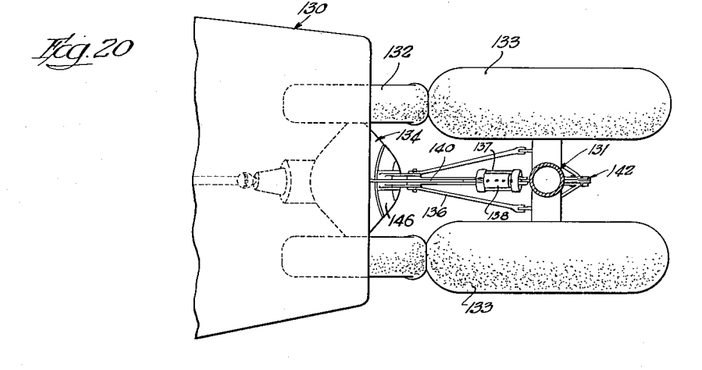
FIG. 20 is a fragmentary top plan view of the modified form shown in FIG. 19.

Another modified form of this invention includes a motor vehicle 130 which is adapted to be directly connected with an airplane 131 in a manner whereby the driven rear wheels 132 of the vehicle may be moved into and from a position engaging and frictionally driving wheels 133 of the landing gear of the airplane. FIG. 19 shows how the rear end of the vehicle 130 may be lifted to move the rear wheels 132 from the ground into frictional driving engagement with the airplane wheels 133.

For certain types of aircraft, the vehicle 130 may be used to advantage in place of the tow bar assembly 1 and vehicle 3, shown in FIGS. 1–16. Like the vehicle 3, the vehicle 130 may be of comparatively small bulk and low weight whereby it also may be equipped with power and service components for normal line servicing of aircraft.

The rear axle assembly 134 of the vehicle 130 may be connected to an airplane by linkage means 136 corresponding to the linkage means shown in FIGS. 7–11, whereby a draft connection is effected between the vehicle and the airplane.

Power operated means 137 corresponding to the power operated means 13 shown in FIGS. 7–11 may be employed to move the wheels 132 of the vehicle 130 into and from driving engagement with the airplane wheels. A control valve unit 138 corresponding to the valve unit 78 may also be employed in connection with the power operated means 137. The valve unit 138 may be actuated by a locking-lever unit 139 in the cab of the vehicle 130, there being a link 140 extending from the lever unit 139 to a valve-actuating lever 141 on the valve unit 138.

Figure 10:
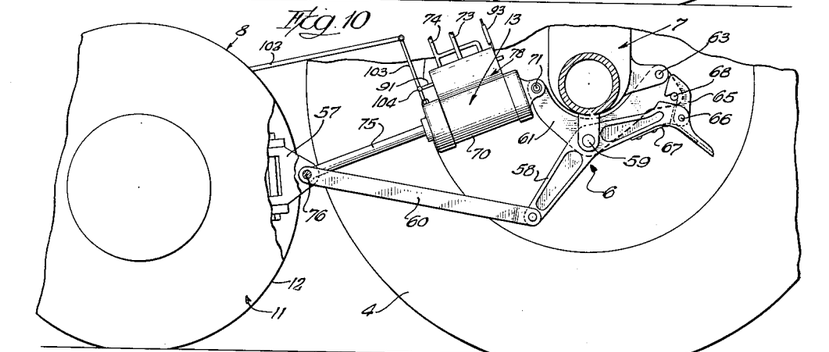
FIG. 10 is a view similar to FIG. 9 illustrating the next step in the operation of connecting the tow bar assembly with the nose wheel assembly of the airplane.
Figure 11:
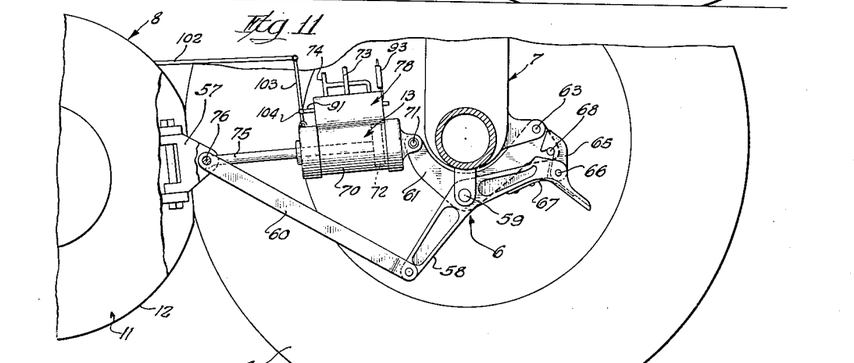
FIG. 11 is a view similar to FIG. 10 showing the drive wheels of the tow bar assembly raised off the ground and held in driving engagement with the nose wheels of the airplane.

When the power operated means 137 is actuated to lift the rear end of the vehicle 130 off the ground, the latch means 142 of the linkage 136 operates in the same manner as shown in FIGS. 10 and 11 to lock the linkage so that the wheels 132 are disposed and held in driving engagement with the wheels 133 of the airplane. The operation and control of the drive wheels 132 may be effected through the levers 139 and 141 and the valve 138 in substantially the same manner as the drive wheels 11 on the tow bar assembly 1.

The vehicle 130 is provided with a main power plant or motor 143 subject to control by suitable means (not shown) in the cab of the vehicle. This motor drives the rear wheels 132 through a transmission unit 144, a drive shaft 145 and a differential unit 146. Other units driven by the motor 143 (but not shown) including a source of hydraulic fluid under pressure are provided on the vehicle. Hose lines 148 and 149, only portions of which are shown, are connected with the source fluid pressure on the vehicle 130 in any suitable manner to supply fluid under pressure to the valve unit 138 and power operated means 137. Suitable gauge means, for example corresponding to the gages 93 and 96 not shown, for indicating the pressure in the power operated means 137, may be arranged in the same manner as shown in FIGS. 17 and 4, respectively.

It will now be apparent that the present invention provides novel and efficient powered and wheeled apparatus of small bulk and low weight compared to apparatus heretofore used, wherein a drive wheel or wheels of the apparatus may be moved between a ground-engaging position and a position for driving one or more wheels of an airplane, or any other heavy wheeled structure, for the purpose of moving and steering the airplane or other structure, as desired, on the ground.

I claim:
1. Apparatus for moving a wheeled structure on the ground comprising: a wheeled assembly having ground-engaging wheels at opposite ends thereof; means on said assembly operable to drive the ground-engaging wheels at one end of the assembly; means connected with said assembly for effecting a draft connection between said assembly and said structure; means on said assembly for elevating said driven wheels into frictional driving engagement with wheels of said structure while the wheels at the other end of said assembly remain on the ground.

2. Apparatus for moving a wheeled structure on the ground comprising: a wheeled assembly; means on said assembly operable for driving ground-engaging wheels of the assembly; power operated means on said assembly for elevating from the ground and holding the driven wheels of said assembly in frictional driving engagement with wheels of said structure; and means operatively connected with said assembly and said power operated means for controlling said frictional driving engagement of said wheels.

3. Apparatus for moving a wheeled structure on the ground comprising: a wheeled assembly; means on said assembly operable for driving wheels thereof to propel the assembly; means for effecting a draft connection between said assembly and said structure; power operated means operatively connected with said last named means operable for elevating from the ground and urging driven wheels of said assembly into frictional driving engagement with wheels of said structure; and control means operatively connected with said power operated means and said assembly for maintaining said frictionally engaged wheels in driving contact with one another under a substantially uniform pressure.

4. Apparatus for moving an aircraft on the ground including: a tow bar assembly; means for connecting said assembly with a motor vehicle having a power take-off unit; drive wheels on said assembly; means on said assembly engageable with an airplane for elevating from the ground and holding said drive wheels in frictional driving engagement with wheels of landing gear of the airplane; and means on said assembly for drivingly connecting said drive wheels with said power take-off unit.

5. Apparatus for moving an airplane over the ground comprising: an elongated, sectional draw bar; means foldably connecting sections of said bar for movement of said sections between aligned position and folded position lying alongside one another; drive wheels on said bar; means on said bar for connecting said bar with a motor vehicle having a power take-off unit; means on said bar for effecting a driving connection between said drive wheels and said power take-off unit; and means on said bar engageable with an airplane for lifting from the ground and holding said drive wheels in driving connection with wheels of the airplane landing gear.

6. Apparatus for moving an aircraft on the ground including: a sectional, elongated draw bar; means hingedly connecting sections of said bar whereby the sections may be folded to lie alongside one another; wheels supporting said bar; means on said bar for connecting said bar with a motor vehicle having a power take-off unit; means on said bar for effecting a draft connection of the bar with an aircraft; means on said bar operable to move said wheels off the ground into frictional driving engagement with wheels of the aircraft landing gear; a sectional drive shaft on said bar operatingly connected with said wheels on said bar for driving said wheels; means on said bar for detachably joining sections of said shaft in driving connection with one another; and means on said bar for drivingly connecting said shaft with said power take-off unit.

7. Apparatus for moving an airplane on the ground including: an elongated bar; means adjacent one end of said bar for detachably connecting said bar with an airplane; means for connecting the other end of said bar with a motor vehicle having a power take-off unit; ground-engaging wheels supporting said one end of said bar; a drive shaft on said bar; means for effecting a drive connection between said shaft and said power take-off unit; means on said bar for drivingly connecting said shaft with said wheels; and power operated means on said bar engageable with said airplane and operable for lifting said one end of said bar to move said wheels off the ground and into frictional driving contact with wheels of landing gear of said airplane.

8. Apparatus for moving an airplane on the ground including: an elongated bar; means adjacent one end of said bar for detachably connecting said bar with an airplane; means for connecting the other end of said bar with a motor vehicle having a power take-off unit; ground-engaging wheels on said one end of said bar; a drive shaft on said bar; means for effecting a drive connection between said shaft and said power take-off unit; means on said bar for drivingly connecting said shaft with said wheels; a power operated link connected to said bar; and means for connecting said link with said airplane whereby operation of said link will move said bar to dispose said wheels off the ground and in frictional driving engagement with wheels of landing gear of said airplane.

9. Apparatus for moving an airplane on the ground comprising: a bar; means adjacent one end of said bar for connecting said bar with a motor vehicle having a power take-off unit; link means connected with the other end of said bar; means on said link means operable to connect said link means with landing gear of an aircraft; a power operated link connected to said other end of said bar for extension and retraction relative thereto; means for connecting the other end of said power operated link to said landing gear so that power operated movement of said link will lift said other end of said bar; drive wheels on said other end of said bar movable into frictional driving contact with wheels of said landing gear responsive to said lifting of said bar; a shaft on said bar having a driving connection with said drive wheels; and means on said bar for connecting said shaft with said power take-off unit.

10. Apparatus for moving an aircraft on the ground comprising: an elongated draw bar having means at opposite ends for effecting a draft connection between landing gear on an airplane and a motor vehicle having a power take-off unit; wheels supporting one end of said bar; means providing a drive connection between said power take-off unit and said wheels on said bar; and means for elevating said one end of said bar for moving said wheels on said bar for operation as a frictional driving connection between wheels of said landing gear and said power take-off unit.

11. Apparatus for moving a wheeled structure on the ground comprising: an elongated assembly supported on wheels disposed in pairs adjacent opposite ends of said assembly; means for connecting one end of said assembly with said wheeled structure to provide a draft connection between said structure and said assembly; means operable on said assembly for driving one pair of wheels on said assembly; and means operatively connected with said connecting means for supporting said one end of said assembly in an elevated position with said one pair of wheels of said assembly off the ground and in frictional driving engagement with wheels of said structure while wheels on the other end of said assembly remain on the ground.

12. Apparatus for moving a wheeled structure on the ground comprising: a motor vehicle having sets of ground-engaging wheels; means on the rear end of said vehicle for effecting a draft connection with said wheeled structure; and means operatively connected with said connecting means operable for moving a set of wheels of said vehicle off the ground and holding them in frictional driving engagement with wheels of said structure while the other set of said wheels engage the ground to support said vehicle in cooperation with said means for effecting said draft connection.

13. Apparatus for moving a wheeled structure on the ground comprising: a wheeled assembly; means on said assembly operable for driving wheels of the assembly; a pair of levers; means for pivotally mounting said levers in laterally spaced relation on said structure between wheels of the structure; links pivotally connecting said levers with an end of said assembly; said links diverging from their points of connection with said assembly toward said levers; latch members on said lever for latching said levers with said structure; and power operating means connected with said levers operable to elevate wheels of the assembly into frictional driving engagement with said wheels of said structure.

14. A method of moving an airplane on the ground by means of a wheeled assembly having pairs of ground-engaging wheels; comprising the steps of: coupling said assembly with the landing gear of an airplane; moving one of said pairs of ground-engaging wheels of said assembly off the ground into a position for engaging and frictionally driving wheels on said landing gear while another of said pairs remains on the ground; and driving said one pair of wheels while engaged with landing gear wheels, thereby to move said airplane.

15. A method of moving an airplane on the ground by means of a wheeled and powered assembly having steering means and pairs of ground-engaging wheels; which includes the steps of: effecting a draft connection of said assembly with the landing gear of an aircraft; moving a pair of said ground-engaging wheels of said assembly off the ground into a position for engaging and frictionally driving wheels of said landing gear while other wheels of said powered assembly remain on the ground; moving said airplane and said assembly as a unit by driving said elevated wheels while in said driving engagement with said landing gear wheels; and steering said airplane by steering said assembly as the latter is moved with said airplane.

16. Apparatus for moving a wheeled structure on the ground comprising: a motor vehicle having pairs of ground engaging wheels at least one pair of which are power driven; draft means for effecting a draft connection between said wheeled structure and said motor vehicle; and means operatively connected with said draft means and said motor vehicle for moving said one pair of power driven wheels of said vehicle between ground engaging position and a position for frictionally engaging and moving wheels of said structure while another pair of said wheels on said vehicle remains on the ground.

17. Apparatus for moving on the ground a wheeled structure equipped with pneumatic tires, said apparatus comprising: a motor vehicle provided with a pair of steerable ground-engaging wheels and a pair of power driven ground-engaging wheels equipped with pneumatic tires; coupling means connected with said vehicle for effecting a draft connection with said wheeled structure; power operated means operatively connected with said motor vehicle and said coupling means; means for operating said power operated means to urge the tires on said power driven ground-engaging wheels off the ground and under pressure against the tires on the wheels of said wheeled structure while said steerable wheels remain on the ground.

18. Apparatus for moving a wheeled structure on the ground comprising: a motor vehicle provided with a pair of steerable wheels and a pair of power driven ground-engaging wheels; and means connected with said vehicle for effecting a draft connection with said wheeled structure; power operated means operatively connected with said draft means and said motor vehicle; and means for operating said power operated means to lift an end of said motor vehicle to position said pair of power driven wheels of said motor vehicle in driving engagement with wheels of said structure while said steerable wheels remain on the ground.

19. The method of moving an aircraft on the ground comprising: connecting a vehicle having steerable wheel means and driven ground engaging wheel means with an aircraft having ground engaging wheel means; elevating said driven ground engaging wheel means of the vehicle to frictionally engage peripheral portions thereof with peripheral portions of said ground engaging wheel means of the aircraft; and driving said elevated wheel means while so engaged with said ground-engaging wheel means of the aircraft and steering said vehicle with said steerable wheel means while the latter are on the ground and said driven wheel means drive said wheel means on the aircraft.

20. The method of moving an aircraft on the ground comprising the steps of: connecting to an aircraft having ground engaging wheel means, a vehicle having ground engaging wheel means and steerable ground engaging wheel means; elevating one of said ground engaging wheel means of the vehicle from the ground into frictional engagement with ground engaging wheel means of the aircraft while the other of said wheel means remains on the ground; and driving said elevated wheel means while frictionally engaged with said wheel means of the aircraft.

21. The method of moving an aircraft on the ground comprising the steps of: connecting to an aircraft having ground engaging wheel means, a vehicle having driven ground engaging wheel means; other ground-engaging wheel means on said vehicle; elevating said driven ground engaging wheel means of the vehicle from the ground into frictional driving engagement with wheel means of the aircraft while said other ground-engaging wheel means are on the ground; and driving said elevated wheel means while so engaged with said wheel means of the aircraft to move the aircraft with said other wheel means trailing.

22. The method of moving an aircraft along the ground which includes the steps of: effecting a draft connection between an aircraft supported by wheel means and a vehicle supported by a first wheel means and other wheel means; moving the vehicle about the axis of said other wheel means to lift said first wheel means thereof from the ground into frictional driving engagement with wheel means of the aircraft; and driving said first wheel means while in said frictional driving engagement with wheel means of the aircraft.

23. A method of moving an aircraft on the ground by applying to pneumatic tires on wheels of the aircraft landing gear, a driving force derived by contact of said tires with pneumatic tires on driven vehicle-supporting wheels of a motor vehicle, said motor vehicle having other ground-engaging wheels, the method comprising the steps of: effecting a draft connection between such a motor vehicle and the landing gear of such an aircraft; elevating said driven wheels while said other wheels rest on the ground; urging said elevated wheels under pressure to effect pressurized frictional driving engagement of the tires on said elevated wheels with the tires on said landing gear wheels; and driving said elevated wheels while in said pressurized engagement with said landing gear wheels to drive the latter and thus move both the aircraft and said motor vehicle by the tractive effort of said landing gear wheels, with said motor vehicle supported by the aircraft and said other wheels.

24. A method of moving an aircraft on the ground by applying to pneumatic tires on wheels of the landing gear a driving force derived by contact of said tires with pneumatic tires on driven vehicle-supporting wheels of a motor vehicle, said motor vehicle having other ground-engaging wheels, the method comprising the steps of: effecting a draft connection between such a motor vehicle and the landing gear of such an aircraft; raising a portion of said motor vehicle while said other ground-engaging wheels remain on the ground thereby supporting said motor vehicle by means of the aircraft and said other ground-engaging wheels and elevating said driven wheels; urging said elevated wheels under pressure to effect pressurized frictional driving engagement of the tires on said elevated wheels with the tires on said landing gear wheels; maintaining said frictional engagement of said tires at a predetermined pressure; and driving said elevated wheels while in said pressurized engagement with said landing gear wheels to drive the latter and thus move both the aircraft and said motor vehicle by the tractive effort of said landing gear wheels.

25. A vehicle for moving along the ground an aircraft supported by wheel means, including: first and second ground-engaging wheel means by which the vehicle is supported; means for effecting relative movement between said first and second wheel means to position one such wheel means in frictional contact with said wheel means of said aircraft; means for driving said one wheel means; and means for holding said driven wheel means above the ground while in said contact with said wheel means of the aircraft to effect frictional driving engagement of the wheel means of the aircraft and while the other of said two wheel means of the vehicle remain on the ground.

26. A vehicle for moving along the ground an aircraft supported by wheel means, including: first and second ground engaging wheel means for supporting the vehicle; means for connecting said vehicle with said aircraft; means cooperable with said connecting means for effecting relative vertical movement of said first and second wheel means to position said first wheel means above said second wheel means; means for driving said first ground engaging wheel means of the vehicle; and means for urging said driven wheel means into frictional driving engagement with wheel means of the aircraft while said second wheel means is supported on the ground.

27. A vehicle for moving along the ground an aircraft supported by wheel means, including: ground engaging wheel units supporting the vehicle and longitudinally spaced thereon; means for effecting a detachable draft connection between the vehicle and the aircraft; means for driving one of said ground engaging wheel units of the vehicle; and means operable from said vehicle and cooperable with said draft connection means for lifting an end of the vehicle off the ground to move said one driven wheel unit from the ground and forwardly of said end of the vehicle into frictional driving engagement with wheel means of the aircraft while the other of said wheel units is supported on the ground.

28. A vehicle for moving along the ground an aircraft supported by wheel means provided with pneumatic tire means including: separate ground-engaging wheel means longitudinally spaced on and supporting the vehicle; means for driving one of said separate ground engaging wheel means of the vehicle; said driven wheel means having pneumatic tire means thereon; and power operated means for connection with said aircraft and said vehicle operable for lifting said driven wheel means with said tire means thereon into frictional driving engagement with said tire means on the wheel means of the aircraft while other of said separate wheel means serves as a support for the vehicle.

29. A vehicle for moving along the ground an aircraft supported by wheel means equipped with pneumatic tire means including: ground engaging wheel means longitudinally spaced on and supporting the vehicle; means for driving one of said ground engaging wheel means by which the vehicle is supported; said driven wheel means being equipped with pneumatic tire means; means for effecting a draft connection between said vehicle and the aircraft; power operated mechanism connected with said draft connection means and operable from said vehicle for elevating said vehicle to dispose said driven wheel means off the ground with said tire means thereon in frictional driving engagement with said tire means on said aircraft wheel means while other of said wheel means of the vehicle remain on the ground; and means operable from said vehicle for controlling said power operated mechanism to vary the pressure of said tire means on said driven wheel means against the tire means on said wheel means of the aircraft.

30. A motor vehicle for moving on the ground an aircraft having a wheeled landing gear in which the wheels are provided with pneumatic tires; said motor vehicle including wheels at least two of which have pneumatic tires thereon and are driven for propelling the motor vehicle; coupling means connected with said motor vehicle; means for operating said coupling means to effect a draft connection between said motor vehicle and said landing gear; power operated means operatively connected with said motor vehicle and said coupling means; means for operating said power operated means to elevate driven wheels of the vehicle into position to frictionally engage the tires thereon with the tires on wheels of the landing gear; means associated with said power operated means for continuously applying pressure urging the tires on said elevated wheel against the tires on said landing gear wheels; and means for regulating the pressure at which said elevated wheels are engaged with said landing gear wheels.

31. A wheeled vehicle movable on the ground and engageable with the landing gear of an aircraft for moving the aircraft by driving the aircraft landing gear wheels comprising: a body having ground engaging supporting wheels, revolvable aircraft wheel driving means at one end of said body and drivingly engageable with said aircraft landing gear wheels with said driving means wholly disposed in spaced relation to the ground for driving said wheels in opposite directions; connector means for connecting said vehicle to said landing gear including extensible and retractable piston and cylinder means having one end connected to said body adjacent said wheel driving means and extending from said body for movement toward and away from said landing gear, and rigid means having one end connected to the free end of said piston and cylinder means and the other end connectable to said landing gear to prevent unitary movement of said piston and cylinder means relative to said landing gear in a longitudinal direction relative to the axis of said landing gear wheels; one of said connections having means enabling adjustment of said rigid means relative to said landing gear to facilitate connecting said rigid means to said landing gear; fluid pressure supplying means for effecting contraction of said piston and cylinder means to forcibly crowd said driving means into engagement with said landing gear wheels; and means for driving said driving means in either direction while so crowded into engagement with said landing gear wheels to effect rotation of said landing gear wheels in either direction.

32. A wheeled vehicle movable on the ground and engageable with the landing gear of an aircraft for moving the aircraft by driving the aircraft landing gear wheels comprising: a body having ground engaging supporting wheels, revolvable aircraft wheel driving means at one end of said body and drivingly engageable with said aircraft landing gear wheels with said driving means wholly disposed in spaced relation to the ground for driving said wheels in opposite directions; connector means for connecting said vehicle to said landing gear including extensible and retractable means having one end connected to said body adjacent said wheel driving means and extending from said body for movement toward and away from said landing gear, and rigid means having one end connected to the free end of said extensible and retractable means and the other end connectable to said landing gear to prevent unitary movement of said extensible and retractable means relative to said landing gear in a longitudinal direction relative to the axis of said landing gear wheels; one of said connections having means enabling adjustment of said rigid means relative to said landing gear to facilitate connecting said rigid means to said landing gear; means for effecting contraction of said extensible and contractable means to forcibly crowd said driving means into engagement with said landing gear wheels; and means for driving said driving means in either direction while so crowded into engagement with said landing gear wheels to effect rotation of said landing gear wheels in either direction.

References Cited in the file of this patent
UNITED STATES PATENTS

| | | |
|---|---|---|
| 1,414,938 | Denton | May 2, 1922 |
| 2,360,901 | Simmons | Oct. 24, 1944 |
| 2,409,552 | Donnellan | Oct. 15, 1946 |
| 2,529,159 | Hyler | Nov. 7, 1950 |
| 2,669,314 | Quayle | Feb. 16, 1954 |
| 2,740,485 | Mohler | Apr. 3, 1956 |
| 2,751,990 | Finlay et al. | June 26, 1956 |
| 2,778,181 | Gray | Jan. 22, 1957 |
| 2,828,142 | Hamblin | Mar. 25, 1958 |

FOREIGN PATENTS

| | | |
|---|---|---|
| 576,649 | Great Britain | Apr. 12, 1946 |